United States Patent
Zhang et al.

(10) Patent No.: US 11,769,499 B2
(45) Date of Patent: Sep. 26, 2023

(54) DRIVING INTERACTION OBJECT

(71) Applicant: Beijing Sensetime Technology Development Co., Ltd., Beijing (CN)

(72) Inventors: Zilong Zhang, Beijing (CN); Qing Luan, Beijing (CN); Lin Sun, Beijing (CN)

(73) Assignee: Beijing Sensetime Technology Development Co., Ltd., Beijing (CN)

( * ) Notice: Subject to any disclaimer, the term of this patent is extended or adjusted under 35 U.S.C. 154(b) by 267 days.

(21) Appl. No.: 17/204,568

(22) Filed: Mar. 17, 2021

(65) Prior Publication Data

US 2021/0201908 A1 Jul. 1, 2021

Related U.S. Application Data

(63) Continuation of application No. PCT/CN2020/104465, filed on Jul. 24, 2020.

(30) Foreign Application Priority Data

Nov. 28, 2019 (CN) .......................... 201911195280.5

(51) Int. Cl.
*G10L 15/22* (2006.01)
*G06F 3/16* (2006.01)
*G10L 15/30* (2013.01)
*G10L 25/84* (2013.01)

(52) U.S. Cl.
CPC .............. *G10L 15/22* (2013.01); *G06F 3/165* (2013.01); *G10L 15/30* (2013.01); *G10L 25/84* (2013.01)

(58) Field of Classification Search
USPC ...................................................... 704/1–504
See application file for complete search history.

(56) References Cited

U.S. PATENT DOCUMENTS

| | | | |
|---|---|---|---|
| 9,601,113 B2* | 3/2017 | Anandarajah | G06F 3/038 |
| 11,056,108 B2* | 7/2021 | Wu | G06F 3/167 |
| 2013/0044570 A1* | 2/2013 | Mkrtchyan | A63H 3/28 |
| | | | 367/197 |
| 2015/0019227 A1* | 1/2015 | Anandarajah | G10L 15/18 |
| | | | 704/257 |

(Continued)

FOREIGN PATENT DOCUMENTS

| | | |
|---|---|---|
| CN | 107704169 A | 2/2018 |
| CN | 107861626 A | 3/2018 |

(Continued)

OTHER PUBLICATIONS

Office Action and Search Report Issued in Chinese Application No. 2019111952805, dated Apr. 21, 2021, 23 pages.

(Continued)

*Primary Examiner* — Marcus T Riley (57) ABSTRACT

Methods, electronic devices, and storage media for driving an interaction object are provided. The methods include: obtaining an audio signal at a periphery of a display device; obtaining, based on the audio signal, first driving data for driving the interaction object to respond; monitoring, in response to outputting the first driving data, the audio signal for detecting a sound of a target object; and driving, based on a presence state of the sound of the target object in the audio signal, the interaction object to respond.

18 Claims, 3 Drawing Sheets

(56) References Cited

U.S. PATENT DOCUMENTS

| | | | |
|---|---|---|---|
| 2015/0066497 A1* | 3/2015 | Sun | G10L 15/065 |
| | | | 704/233 |
| 2015/0360366 A1 | 12/2015 | Gupta et al. | |
| 2018/0096682 A1* | 4/2018 | Cho | G10L 21/0232 |
| 2018/0352354 A1 | 12/2018 | Chandrashekar et al. | |
| 2019/0043511 A1 | 2/2019 | Zhang | |
| 2019/0164536 A1* | 5/2019 | Huh | G10L 15/06 |
| 2020/0035241 A1 | 1/2020 | Chang | |
| 2021/0201908 A1* | 7/2021 | Zhang | G06F 3/167 |

FOREIGN PATENT DOCUMENTS

| | | | | |
|---|---|---|---|---|
| CN | 107894833 A | | 4/2018 | |
| CN | 108305640 A | | 7/2018 | |
| CN | 108536790 A | | 9/2018 | |
| CN | 109346076 A | | 2/2019 | |
| CN | 109710055 A | | 5/2019 | |
| CN | 109710055 A | * | 5/2019 | B60R 22/48 |
| CN | 109976519 A | | 7/2019 | |
| CN | 110010125 A | | 7/2019 | |
| CN | 110033776 A | | 7/2019 | |
| CN | 110060678 A | | 7/2019 | |
| CN | 110069608 A | | 7/2019 | |
| CN | 110413841 A | | 11/2019 | |
| CN | 110989900 A | | 4/2020 | |
| JP | 2018523156 A | | 8/2018 | |
| JP | 2018185431 A | | 11/2018 | |
| TW | 201439876 A | | 10/2014 | |
| TW | 201915698 A | | 4/2019 | |
| WO | 2019187834 A1 | | 10/2019 | |

OTHER PUBLICATIONS

Japanese Patent Office, Office Action Issued in Application No. 2021-521785, dated Jun. 29, 2022, 6 pages.
International Search Report and Written Opinion for Application No. PCT/CN2020/104465, dated Oct. 30, 2020, 10 pages.
Office Action and Search Report for Chinese Application No. 2019111952805, dated Oct. 12, 2020, 23 pages.
Office Action Issued in Taiwan Application No. 109129388, dated Oct. 12, 2021, 16 pages.
Tae-Geun Lee et al, "Software architecture of human-like robot", ICROS-SICE International Joint Conference 2009, Aug. 18-21, 2009, Fukuoka International Congress Center, Japan, 5 pages.
Li Yanyan et al, "Scheme on Faults Management of Components Based on Robot Control Software", Ordnance Industry Automation, May 31, 2017, 4 pages. [English Abstract].

* cited by examiner

DRIVING INTERACTION OBJECT

CROSS REFERENCE TO RELATED APPLICATIONS

This patent application is a continuation application of International Application No. PCT/CN2020/104465, filed on Jul. 24, 2020, which is based on and claims priority to and benefits of Chinese Patent Application No. 201911195280.5 filed on Nov. 28, 2019. The entire content of all of above identified applications is incorporated herein by reference.

TECHNICAL FIELD

The present disclosure relates to the field of computer vision technologies, and in particular, to methods, apparatuses, electronic devices and storage media for driving an interaction object.

BACKGROUND

Various human-machine interactions are mostly in a manner that input is acquired based on keys, touches and voices, and images and texts are presented on a display screen as response. Currently, virtual characters are improved mostly on the basis of a voice assistant and merely output voices which are input through a device. A dialog between a user and a virtual character may be delayed and the virtual characters cannot respond to the user according to a speaking state of the user, which leads to an unnatural interaction.

SUMMARY

According to an aspect of the present disclosure, a method of driving an interaction object is provided, the method including: obtaining an audio signal at a periphery of a display device; obtaining, based on the audio signal, first driving data for driving the interaction object to respond; monitoring, in response to outputting the first driving data, the audio signal for detecting a sound of a target object; driving, based on a presence state of the sound of the target object in the audio signal, the interaction object to respond.

In combination with any embodiment provided by the present disclosure, obtaining, based on the audio signal, the first driving data for driving the interaction object to respond includes, determining, in response to that target information is detected in the audio signal, a first specified action matching the target information; and obtaining the first driving data for driving the interaction object to perform the first specified action.

In combination with any embodiment provided by the present disclosure, the first driving data includes at least one of first audio driving data or first action driving data, and the first audio driving data is regarding a sound generated by performing the first specified action. Monitoring, in response to outputting the first driving data, the audio signal for detecting the sound of the target object includes one of: driving, in response to outputting the first action driving data, the interaction object to perform the first specified action and monitor the audio signal for detecting the sound of the target object; or, monitoring, in response to outputting a sound based on the first audio driving data, the audio signal for detecting the sound of the target object.

In combination with any embodiment provided by the present disclosure, driving, based on the presence state of the sound of the target object in the audio signal, the interaction object to respond includes driving, in response to that the sound of the target object is detected within a first preset time, the interaction object to perform the first specified action repeatedly.

In combination with any embodiment provided by the present disclosure, driving, based on the presence state of the sound of the target object in the audio signal, the interaction object to respond includes driving, in response to that the sound of the target object is not detected within a first preset time, the interaction object to return to an initial posture after the first specified action is ended.

In combination with any embodiment provided by the present disclosure, the method further includes, when the interaction object is driven to return to the initial posture after the first specified action is ended, obtaining, based on the audio signal, second driving data for driving the interaction object to respond, wherein the second driving data includes at least one of second audio driving data or second action driving data; and driving, based on the second driving data, the interaction object to respond.

In combination with any embodiment provided by the present disclosure, obtaining, based on the audio signal, the second driving data for driving the interaction object to respond includes, sending the audio signal to a server, such that the server generates, based on the audio signal, the second driving data for driving the interaction object to respond; and receiving the second driving data from the server.

In combination with any embodiment provided by the present disclosure, the method further includes, when the interaction object is driven to return to the initial posture after the first specified action is ended, calling, in response to not receiving the second driving data from the server within a second preset time, preset third driving data for driving the interaction object to respond, where the third driving data includes at least one of third audio driving data or third action driving data.

In combination with any embodiment provided by the present disclosure, the method further includes, detecting an intensity of environmental noise based on the audio signal; and adjusting, based on the intensity of environmental noise, a volume of a sound output from the display device during the interaction object responding.

In combination with any embodiment provided by the present disclosure, a plurality of audio signals are obtained by a plurality of sound detection modules distributed in different directions with respect to the display device; and the method further includes, determining an intensity of environmental noise in different directions based on the multiple audio signals respectively obtained by the sound detection modules; and driving the interaction object to guide the target object to change a position for interaction based on the intensity of environmental noise in different directions.

According to an aspect of the present disclosure, an apparatus for driving an interaction object is provided, including: a first obtaining unit, configured to obtain an audio signal at a periphery of a display device; a second obtaining unit, configured to obtain, based on the audio signal, first driving data for driving the interaction object to respond; a monitoring unit, configured to monitor, in response to outputting the first driving data, the audio signal for detecting a sound of a target object; and a first driving unit, configured to drive, based on a presence state of the sound of the target object in the audio signal, the interaction object to respond.

In combination with any embodiment provided by the present disclosure, the second obtaining unit is configured to, determine, in response to that target information is detected in the audio signal, a first specified action matching the target information; obtain the first driving data for driving the interaction object to perform the first specified action.

In combination with any embodiment provided by the present disclosure, the first driving data includes at least one of first audio driving data or first action driving data, the first audio driving data is regarding a sound generated by performing the first specified action; the monitoring unit is configured to, drive, in response to outputting the first action driving data, the interaction object to perform the first specified action, and monitor the audio signal for detecting the sound of the target object; or, monitor, in response to outputting a sound based on the first audio driving data, the audio signal for detecting the sound of the target object.

In combination with any embodiment provided by the present disclosure, the first driving unit is configured to, drive, in response to that the sound of the target object is detected within a first preset time, the interaction object to perform the first specified action repeatedly.

In combination with any embodiment provided by the present disclosure, the first driving unit is configured to, drive, in response to that the sound of the target object is not detected within a first preset time, the interaction object to return to an initial posture after the first specified action is ended.

In combination with any embodiment provided by the present disclosure, the apparatus further includes a second driving unit configured to, obtain, when the interaction object is driven to return to the initial posture after the first specified action is ended, obtain, based on the audio signal, second driving data for driving the interaction object to respond, wherein the second driving data comprises at least one of second audio driving data or second action driving data, and drive, based on the second driving data, the interaction object to respond.

In combination with any embodiment provided by the present disclosure, when obtaining, based on the audio signal, the second driving data for driving the interaction object to respond, the second driving unit is configured to send the audio signal to a server, such that the server generates, based on the audio signal, the second driving data for driving the interaction object to respond, and receive the second driving data from the server.

In combination with any embodiment provided by the present disclosure, the apparatus further includes a third driving unit configured to when the interaction object is driven to return to the initial posture after the first specified action is ended, call, in response to not receiving the second driving data from the server within a second preset time, preset third driving data for driving the interaction object to respond, where the third driving data includes at least one of third audio driving data or third action driving data.

In combination with any embodiment provided by the present disclosure, the apparatus further includes an adjustment unit configured to, detect an intensity of environmental noise based on the audio signal, and adjust, based on the intensity of environmental noise, a volume of a sound output from the display device during the interaction object responding.

In combination with any embodiment provided by the present disclosure, a plurality of audio signals are obtained through a plurality of sound detection modules distributed in different directions with respect to the display device, and the apparatus further includes a fourth driving unit configured to determine an intensity of environmental noise in different directions based on the audio signals respectively obtained by the sound detection modules; and drive, based on the intensity of environmental noise in the different directions, the interaction object to guide the target object to change a position for interaction.

According to an aspect of the present disclosure, a display device equipped with a transparent display screen for displaying an interaction object is provided, and the display device performs operations in the method in any of the above embodiments to drive the interaction object displayed in the transparent display screen to respond to a target object.

According to an aspect of the present disclosure, an electronic device is provided, including: a processor, and a memory for storing a computer program executable on the processor; wherein when executing the computer program, the processor is caused to implement the method in any of the above embodiments According to an aspect of the present disclosure, a non-transitory computer readable storage medium is provided for storing a computer program, wherein the computer program is executed to perform the operations in the method according to any of the above embodiments.

Methods, apparatuses, electronic devices, and a storage media for driving an interaction object are provided according to embodiments of the present disclosure. An interaction object is driven to respond to a target object based on an audio signal at the periphery of a display device, the audio signal is monitored to detect a sound of the target object once first driving data is output, and the interaction object is driven to respond based on a presence state of the sound of the target object. As such, while performing an action, the interaction object may adjust the action based on the speaking state of the target object. The interaction between the interaction object and the target object may be more realistic and natural, and a higher-level communication requirement of the target object may be satisfied.

BRIEF DESCRIPTION OF THE DRAWINGS

To describe more clearly one or more embodiments of the present description or technical solutions in the prior art, The following briefly introduces the drawings required for describing the embodiments or the prior art. Obviously, the drawings described below are merely some embodiments described in one or more embodiments of the present description. For a person of ordinary skill in the art, without involving any inventive effort, Other figures may also be obtained from these figures.

DETAILED DESCRIPTION OF THE EMBODIMENTS

Exemplary embodiments will be described in detail herein, examples of which are shown in the accompanying drawings. The following description relates to the drawings, unless otherwise indicated, the same numerals in the different figures represent the same or similar elements. The embodiments described in the following exemplary embodiments do not represent all embodiments consistent with the present disclosure. Rather, they are merely examples of the device and method consistent with some aspects of the disclosure as detailed in the appended claims.

The term "and/or" herein is merely an association relationship describing an associated object, and represents that there may be three relationships, for example, A and/or B, and may represent: A exists separately, A and B exist separately, and B exists separately. In addition, the term 'at least one' herein denotes any combination of at least two of any one or more of a plurality of, for example, at least one of A, B, and C, and may denote any one or more elements selected from the set consisting of A, B, and C.

A method of driving an interaction object is provided according to an embodiment of the present disclosure. The method may be performed by an electronic device such as a terminal device or a server. The terminal device may be a fixed terminal or a mobile terminal, for example, mobile phones, tablet computers, game machines, desktop machines, advertising machines, integrated machines, or vehicle-mounted terminals. The method may also be performed by a processor invoking computer readable instructions stored in a memory.

In embodiments of the present disclosure, the interaction object may be any object capable of interacting with the target object, including a virtual character, a virtual animal, a virtual item, a cartoon image, and other virtual images implementing interaction functions. The target object may be a user, or a robot, or other smart device. The interaction mode between the interaction object and the target object may be an active interaction mode or a passive interaction mode. In an embodiment, the target object may send a demand by making a gesture or a body movement, and trigger interaction of the interaction object with the target object in an active interaction manner. In another example, the target object may be caused to interact with the interaction object in a passive manner in which the interaction object actively greets the target object, prompts the target object to make an action or the like.

The interaction object may be displayed by a display device, and the display device may be an electronic device with a display function, such as an integrated machine, a projector, a virtual reality (VR) device and an augmented reality (AR) device which have a display, or a display device with a special display effect.

Figure 1:
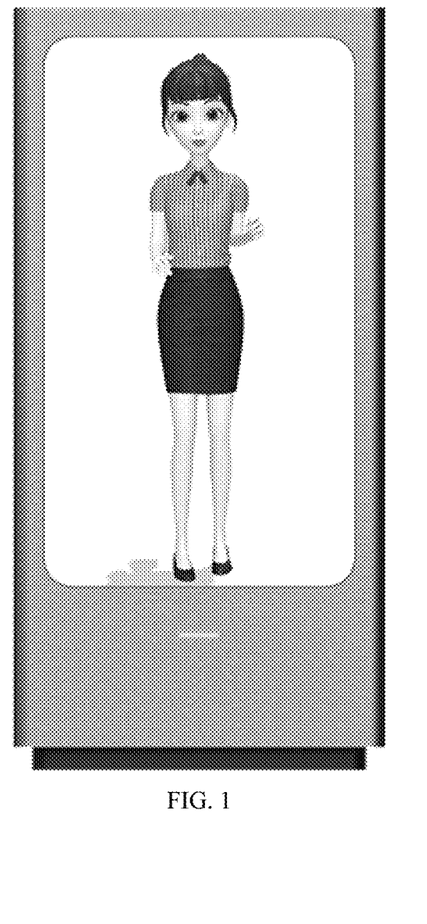
FIG. 1 is a schematic diagram of a display device in a method of driving an interaction object according to an embodiment of the present disclosure.

FIG. 1 illustrates a display device according to an embodiment of the present disclosure. As shown in FIG. 1, the display device has a transparent display screen on which a virtual scene and an interaction object with stereoscopic effect are displayed. For example, the interaction object displayed on the transparent display screen in FIG. 1 is a virtual cartoon character. In some embodiments, the terminal device in the present disclosure may be the above display device in which a memory and a processor are deployed. The memory is configured to store computer instructions executable on the processor. The processor is configured to, when executing the computer instructions, perform the method of driving the interaction object according to the present disclosure, to drive the interaction object displayed on the transparent display screen to respond to the target object.

In some embodiments, the interaction object may make a specified action, present an expression, or send a specified audio to the target object, in response to that a display device receives driving data for driving an interaction object to make an action, present an expression or output audio. Driving data may be generated based on the action, the expression, an identity, a preference, etc. of the target object at the periphery of the display device, to drive the interaction object to respond, thereby providing a simulated service for the target object. In the process of interaction between the interaction object and the target object, there is a situation in which the interaction object cannot make an appropriate response based on the behavior of the target object, for example, when the target object stops speaking and indexes, the interaction object maintains a stationary state, such that the target object feels an obstacle to communicate with the interaction object and the use experience is decreased. Based on this, a method of driving an interaction object is provided according to an embodiment of the present disclosure to improve interaction experience of the target object with the interaction object in an interaction process.

Figure 2:
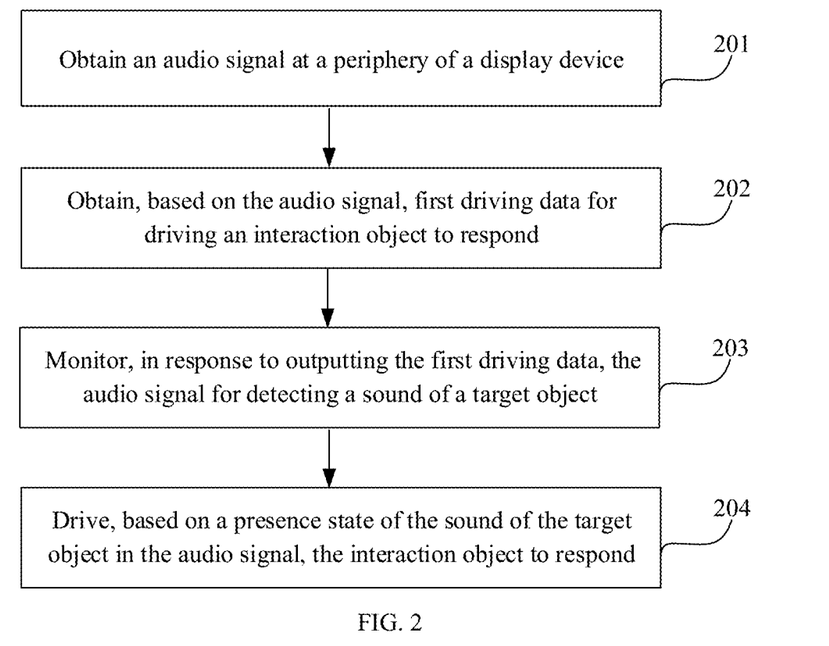
FIG. 2 is a flowchart of driving an interaction object according to an embodiment of the present disclosure.

FIG. 2 illustrates a flowchart of driving an interaction object according to an embodiment of the present disclosure. As shown in FIG. 2, the method includes steps 201 to 204.

At Step 201, an audio signal at a periphery of a display device is obtained.

The periphery of the display device includes a spatial range in any direction where the display device is located, for example, may include one or more directions of a forward direction, a lateral direction, a rear direction, and an upper direction of the display device. The spatial range is determined based on a range of the audio signal with a preset intensity received by a sound detection module for detecting the audio signal.

The sound detection module for detecting the audio signal at the periphery of the display device may include a microphone and a processor, where the processor is configured to process the sound signal obtained by the microphone and output the audio signal. The sound detection module may be disposed in the display device as a built-in module of the display device, or independent of the display device as an external device.

When the number of sound detection modules is more than one, the sound detection modules may be disposed at different positions of the display device, to obtain sound signals in different directions at the periphery of the display device, or disposed in one of directions at the periphery of the display device to collectively obtain the sound signal in this direction. The position of the sound detection module may be determined based on an interaction requirement, which is not limited in the embodiments of the present disclosure.

At Step 202, first driving data for driving the interaction object to respond is obtained based on the audio signal.

The sound detection module in the display device detects the audio signal, and obtains the first driving data based on the detection result to drive the interaction object to respond to the target object.

In some embodiments, target information triggers the interaction object to perform the first specified action when the audio signal includes the target information conforming to the first specified action performed by the interaction object. The first specified action may be a certain action performed by the interaction object, for example, hand waving. When performing the first specified action, the sound output module of the display device may also output the corresponding sound while the first specified action is performed. For example, when it is detected that the audio signal includes the target information, the first driving data corresponding to the target information is obtained to drive the interaction object to perform the first specified action.

At Step 203, the audio signal is monitored for detecting the sound of the target object in response to outputting the first driving data.

The audio signal is monitored for detecting the sound of the target object while the obtained first driving data is output to drive the interaction object to perform the first specified action.

At Step 204, the interaction object is driven to respond based on a presence state of the sound of the target object in the audio signal.

While the interaction object is driven to perform the first specified action, the sound of the target object in the audio signal starts to be monitored, and the interaction object is driven to respond based on the presence state of the sound of the target object such as performing a preset action, outputting a preset sound, or adjusting the state of the interaction object. In this way, an accurate response may be made based on the speaking state of the target object when the interaction object performs the first specified action.

In the embodiments of the present disclosure, based on the audio signal at the periphery of a display device, the audio signal is monitored to detect a sound of the target object once first driving data is output to the interaction object, and the interaction object is driven to respond based on a presence state of the sound of the target object. As such, while performing an action, the interaction object may adjust the action based on the speaking state of the target object. The interaction between the interaction object and the target object may be more realistic and natural, and a higher-level communication requirement of the target object may be satisfied.

In the embodiments of the present disclosure, the first driving data includes first audio driving data and/or first action driving data, where the first audio driving data is regarding a sound generated by performing the first specified action.

In an embodiment, the interaction object may perform the first specified action, with a sound being made or not made. For example, in response to that the interaction object performs the first specified action, with the sound being made, the sound is output based on the first audio driving data while the first action driving data is output to drive the interaction object to perform the first specified action. For another example, in response to that the interaction object performs the first specified action, with the sound being not made, the first action driving data is output to drive the interaction object to perform the first specified action.

In some embodiments, the audio signal is monitored for detecting the sound of the target object in response to that the output first action driving data is detected.

In some embodiments, in response to detecting the output first audio driving data, i.e., once playing the sound corresponding to the first specified action is detected, the audio signal is monitored to detect the sound of the target object.

In the embodiments of the present disclosure, when it is detected that the first action driving data is output or the sound is output based on the first audio driving data, the sound of the target object in the audio signal starts to be detected. Thus, the interaction object may respond to the speaking state of the target object after executing the action instruction in time, making the interactive dialogue process between the interaction object and the target object more realistic and natural, thereby enhancing the target object's interactive experience.

In some embodiments, in response to that the sound of the target object is detected within a first preset time, the interaction object to perform the first specified action repeatedly.

The first preset time may be set based on a pause time when the target object is speaking. For example, the sound of the target object is detected again within 3 seconds of the target object stopping speaking, which indicates that the speaking of the target object does not end, but is paused in the middle period. When the speaking of the target object is continued after the pause time when the target object is speaking expires, if the interaction object is always in a stationary state or maintains in a previous state during the process of the target object continuing to speak, it is possible for the target object to feel an obstacle of interaction with the interaction object, thereby decreasing the interactive experience of the target object.

Therefore, in the embodiments of the present disclosure, in the case where the sound of the target object is detected within the first preset time, the interaction object is driven to perform the first specified action cyclically. For example, in the case where the first specified action is a 'hand waving', after the first action driving data for driving the interaction object to perform the 'hand waving' is output, detecting the sound of the target object in the audio signal is started. If the sound of the target object is detected within the first preset time, for example, 3 seconds, it is indicated that the target object is still speaking after issuing an instruction of waving a hand, and then the interaction object is driven to cyclically perform the action of waving the hand.

The interaction object may be driven to stop performing the first specified action and return the interaction object to an initial gesture when the sound of the target object is not detected within the first preset time.

If it is detected that the audio signal includes other target information during the process of monitoring the sound of the target object, the interaction object is driven to stop performing the first specified action, but to perform the specified action corresponding to the other target information. During the period of the interaction object re-performing the instruction, the process of detecting the sound of the target object may still be repeated until the sound of the target object is not detected, which indicates that the target object stops speaking.

In the embodiments of the present disclosure, in the case where the sound of the target object is detected within the first preset time, the interaction object is driven to cyclically perform the first specified action, such that when the target object continues to speak after the pause time of the speaking expires, the interaction object continues to perform the previous action, thereby the communication between the target object and the interaction object is vivid and natural, and the interaction experience of the target object is improved.

If the sound of the target object fails to be detected within the first preset time, that is, after the instruction for performing the first specified action is sent to the target object, the speaking of the target object is not continued within the first preset time, indicating that the speaking of the target object has ended. After the interaction object performs the first specified action, the interaction object may be driven to return to an initial gesture, such that the interaction between the target object and the interaction object is natural and smooth, and the interaction experience of the target object is improved.

After the speaking of the target object has ended, by analyzing the speaking content of the target object, the interaction intention of the target object is determined, and the content of the interaction object replied to the interaction intention is obtained.

In some embodiments, after the interaction object, upon end of performing the first specified action, is driven to return to the initial posture, second driving data for driving the interaction object to make an audio response is obtained based on the audio signal, where the second driving data includes second audio driving data and/or second action driving data; and the interaction object is driven to respond based on the second driving data.

In an embodiment, the second driving data for driving the interaction object to respond may be called from the driving data stored locally based on the audio signal.

In an embodiment, the audio signal may be sent to a server, such that the server generates second driving data for driving the interaction object to make an audio and/or action response based on the audio signal, then the second driving data from the server is received.

In some embodiments, after the interaction object is driven to return to the initial gesture upon the end of performing the first specified action, in response to not receiving the second driving data from the server within the second preset time, the preset third driving data is called to drive the interaction object to respond. The third driving data includes third audio driving data and/or third action driving data.

In the case where the second driving data is generated by the server, the second driving data that drives the interaction object to respond may not be received in time due to network delay or the like. When the speaking of the target object has ended and the second driving data has not been received for a certain time, the preset third driving data may be called to drive the interaction object to respond. The preset third driving data may be the third audio driving data, for example, the sound output module outputs a sound indicating that the interaction object is thinking or a sound similar to "please wait a moment" and "please let me think about it"; or, the preset third driving data may be the third action driving data, for example, the interaction object is driven to make an action of thinking or make a posture of suspending emotions, etc.; or, the preset third driving data may include the third audio driving data and the third action driving data, for example, a sound of "please let me think about it" is made while the action of thinking is made. Until the second driving data is received, the second driving data is used to drive the interaction object to respond.

In the embodiments of the present disclosure, when the second driving data from the server is not received within a certain time, the preset third driving data is called to drive the interaction object to respond, thereby avoiding the problem of dialog delay caused by the network, making interaction between the target object and the interaction object more natural and smooth, and improving the interaction experience of the target object.

In some embodiments, the intensity of the environmental noise may be detected based on the audio signal, and the volume of a sound output from the display device during the response of the interaction object is adjusted based on the intensity of the environmental noise.

By means of the output signal of the sound detection module, the surrounding environment of the display device, that is, whether the current communication environment is noisy or not, may be learned. In the case where the intensity of the environmental noise exceeds a predetermined threshold, it may be determined that the current environment is noisy, and the volume of the sound output by the sound output module may be adjusted, such that the volume is increased for the interaction object at the angle of the target object. Therefore, the target object may hear the speaking content of the interaction object more clearly and the interaction feeling of the target object is improved.

In some embodiments, there are a plurality of sound detection modules distributed in different directions (or orientations) of the display device. Based on the plurality of audio signals respectively obtained by the sound detection modules, the intensity of environmental noise in different directions may be determined; and the interaction object is driven to guide the target object to change the position for interaction based on the intensity of the environmental noise in different directions.

In the case where the sound detection module is distributed at different positions of the display device, a relatively quiet position at the periphery of the display device may be determined based on the audio signal of each sound detection module, and the target object is guided to move toward the relatively quiet position. As such, the quality of interaction between the target object and the interaction object may be improved, and the interaction feeling of the target object may be improved.

Figure 3:
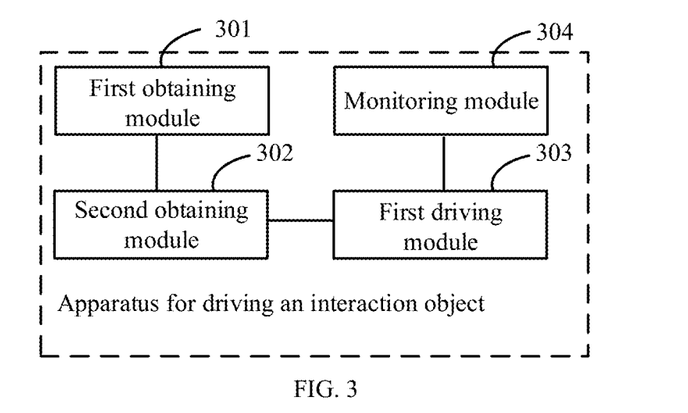
FIG. 3 is a structural diagram of an apparatus for driving an interaction object according to an embodiment of the present disclosure.

FIG. 3 is a structural diagram of an apparatus for driving an interaction object according to an embodiment of the present disclosure. As shown in FIG. 3, the apparatus may include: a first obtaining unit 301 configured to obtain an audio signal at a periphery of a display device; a second obtaining unit 302 configured to obtain, based on the audio signal, first driving data for driving the interaction object to respond; a monitoring unit 303 configured to monitor, in response to outputting the first driving data, the audio signal for detecting a sound of a target object; and a first driving unit 304 configured to drive, based on a presence state of the sound of the target object in the audio signal, the interaction object to respond.

In some embodiments, the second obtaining unit 302 is specifically configured to determine, in response to that target information is detected in the audio signal, a first specified action matching the target information; and obtain first driving data for driving the interaction object to perform the first specified action.

In some embodiments, the first driving data includes first audio driving data and/or first action driving data, wherein the first audio driving data is regarding a sound generated by performing the first specified action; the monitoring unit 303 is specifically configured to, drive, in response to outputting the first action driving data, the interaction object to perform the first specified action, and monitor the audio signal for detecting the sound of the target object; or, monitor, in response to outputting a sound based on the first audio driving data, the audio signal for detecting the sound of the target object.

In some embodiments, the first driving unit 304 is specifically configured to drive, in response to that the sound of the target object is detected within a first preset time, the interaction object to perform the first specified action repeatedly.

In some embodiments, the first driving unit 304 is specifically configured to drive, in response to that the sound of the target object is not detected within a first preset time, the interaction object to return to an initial posture after the first specified action is ended.

In some embodiments, the apparatus further includes a second driving unit configured to, when the interaction object is driven to return to the initial posture after the first specified action is ended, obtain, based on the audio signal, second driving data for driving the interaction object to respond, wherein the second driving data comprises at least one of second audio driving data or second action driving data; and drive, based on the second driving data, the interaction object to respond.

In some embodiments, when the second driving unit obtains, based on the audio signal, the second driving data for driving the interaction object to respond, the second driving unit is configured to send the audio signal to a server, such that the server generates, based on the audio signal, the second driving data for driving the interaction object to respond, and receive the second driving data from the server.

In some embodiments, the apparatus further includes a third driving unit configured to, when the interaction object is driven to return to the initial posture after the first specified action is ended, call, in response to not receiving the second driving data from the server within a second preset time, preset third driving data for driving the interaction object to respond, wherein the third driving data comprises at least one of third audio driving data or third action driving data.

In some embodiments, the apparatus further includes an adjusting unit configured to, detect an intensity of environmental noise based on the audio signal; and adjust, based on the intensity of environmental noise, a volume of a sound output from the display device during the interaction object responding.

In some embodiments, a plurality of audio signals are obtained by a plurality of sound detection modules distributed in different directions with respect to the display device, and the apparatus further includes a fourth driving unit configured to d determine an intensity of environmental noise in different directions based on the audio signals respectively obtained by the sound detection modules; and drive, based on the intensity of the environmental noise in the different directions, the interaction object to guide the target object to change a position for interaction.

Figure 4:
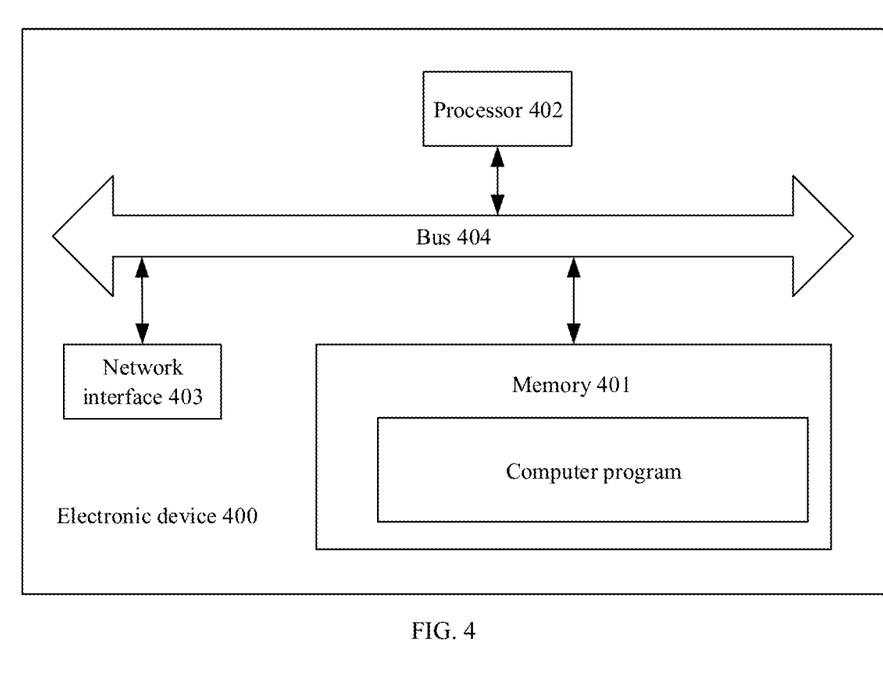
FIG. 4 is a structural diagram of an electronic device according to an embodiment of the present disclosure.

An embodiment of the present description further provides an electronic device. As shown in FIG. 4, the electronic device 400 includes a memory 401 and a processor 402. The processor 402, the network interface 403 and the memory 401 are coupled via a bus 404. The memory 401 is configured to store a computer program executable on the processor 402, and the processor 402 is configured to perform the method of driving the interaction object according to any embodiment of the present disclosure when the computer program is executed.

The processor 402 calls the program code in the memory 401, and is configured to run the first obtaining unit 301, the second obtaining unit 302, the monitoring unit 303, and the first driving unit 304 in FIG. 3. In an embodiment, the processor 402 may include one or more general-purpose processors, where the general-purpose processor may be any type of device capable of processing electronic instructions, including a central processing unit (CPU), a microprocessor, a microcontroller, a main processor, a controller, and an ASIC (Application Specific Integrated Circuit), etc.

In some embodiments, the memory 401 may include a volatile memory (Volatile Memory), such as a random access memory (Random Access Memory, RAM); The memory may also include a non-volatile memory (Non-Volatile Memory), for example, a read-only memory (Read-Only Memory, ROM), a flash memory (Flash Memory), a hard disk (Hard Disk Drive, HDD), or a solid state hard disk (Solid-State Drive, SSD) memory may further include a combination of the above kinds of memory.

In some embodiments, the processor 402 reads the program code stored in the memory 401 to perform operations: obtaining an audio signal at a periphery of a display device; obtaining, based on the audio signal, first driving data for driving the interaction object to respond; monitoring, in response to outputting the first driving data, the audio signal for detecting a sound of a target object; and driving, based on a presence state of the sound of the target object in the audio signal, the interaction object to respond.

An embodiment of the present description further provides a non-transitory computer readable storage medium, on which a computer program is stored, and the program is executed by a processor to implement the driving of the interaction object according to any embodiment of the present disclosure.

The persons skilled in the art should understand that one or more examples of the present disclosure may be provided as methods, systems, or computer program products. Thus, one or more examples of the present disclosure may be implemented in the form of entire hardware examples, entire software examples or examples combining software and hardware. Further, one or more examples of the present disclosure may be implemented in the form of computer program products that are operated on one or more computer available storage media (including but not limited to magnetic disk memory, CD-ROM, and optical memory and so on) including computer available program codes.

Different examples in the present disclosure are described in a progressive manner. Each example focuses on the differences from other examples with those same or similar parts among the examples to be referred to each other. Particularly, since the data processing device examples are basically similar to the method examples, the device examples are briefly described with relevant parts referred to the descriptions of the method examples.

Specific examples of the present disclosure are described above. Other examples not described herein still fall within the scope of the appended claims. In some cases, the desired results may still be achieved by performing actions or blocks that are described in the claims in an order different from that in the examples. In addition, it is not necessary to perform the process depicted in the accompanying drawings in a specific order or successive order shown herein in order to achieve the desired result. In some examples, it is also conceivable or advantageous to perform multi-task processing and parallel processing.

Examples of the subject and functional operations described in the present disclosure may be achieved in the following: a digital electronic circuit, a tangible computer software or firmware, a computer hardware including a structure disclosed in the present disclosure and a structural equivalent thereof, or a combination of one or more of the above. The example of the subject described in the present disclosure may be implemented as one or more computer programs, that is, one or more modules in computer program instructions encoded on a tangible non-transitory program carrier for being executed by or controlling a data processing apparatus. Alternatively or additionally, the program instructions may be encoded on an artificially-generated transmission signal, such as a machine-generated electrical, optical or electromagnetic signal. The signal is generated to encode information and send it to an appropriate receiver such that the signal is executed by the data processing apparatus. The computer storage medium may be a machine readable storage device, a machine readable storage substrate, a random or serial access memory device, or a combination of one or more of the above.

The processing and logic flow described in the present disclosure may be executed by one or more programmable computers executing one or more computer programs to execute corresponding functions by operating based on input data and generating output. The processing and logic flow may be further executed by a dedicated logic circuit, such as a field programmable gate array (FPGN) or an application specific integrated circuit (NSIC), and the apparatus may be further implemented as the dedicated logic circuit.

A computer appropriate for executing computer programs includes, for example, a general and/or dedicated microprocessor or any other type of central processing unit. Generally, the central processing unit receives instructions and data from a read-only memory and/or a random access memory. Basic components of the computer include a central processing unit for implementing or executing instructions and one or more memory devices for storing instructions and data. Generally, the computer further includes one or more mass storage devices for storing data such as magnetic disks, magneto-optical disks or optical disks, or the computer is operably coupled to the mass storage device to receive or send data from or to the mass storage device, or perform both operations. However, it is not necessary for the computer to have such device. In addition, the computer may be embedded into another device, such as a mobile phone, a personal digital assistant (PDN), a mobile audio or video player, a game console, a global positioning system (GPS) receiver, or a portable storage device such as a universal serial bus (USB) flash drive which are only several illustrative examples.

A computer readable medium appropriate for storing computer program instructions and data includes all forms of non-volatile memories, media and memory devices, such as semiconductor memory devices (e.g., an Erasable Programmable Read-Only Memory (EPROM), an Electrically Erasable Programmable Read-Only Memory (EEPROM) and a flash memory device), magnetic disks (e.g., an internal hard disk or a removable disk), magneto-optical disks and CD ROM and DVD-ROM disks. The processor and the memory may be supplemented by the dedicated logic circuit or incorporated into the dedicated logic circuit.

Although the present disclosure includes many specific implementation details, these implementation details should not be interpreted as limiting any disclosed scope or claimed scope, but mainly used to describe the features of specific examples of the present disclosure. Some features described in a plurality of examples of the present disclosure may also be implemented through combination in a single example. On the other hand, different features described in a single example may also be implemented separately in a plurality of examples or implemented with any appropriate sub-combination. In addition, although the features may act in some combinations as described above and are claimed initially in this way, one or more features from the claimed combination may be removed from the combination in some cases, and the claimed combination may point to the sub-combination or a variation of the sub-combination.

Similarly, although the operations are described in a specific order in the drawings, it should not be understood that these operations are to be performed in a specific order or sequentially or all operations illustrated herein are to be performed so as to achieve a desired result. In some cases, multi-task processing and parallel processing may be advantageous. In addition, it shall not be understood that those system modules and components separated in the above examples shall be separated in all examples. It should be understood that the described program components and systems usually may be integrated into a single software product or packaged in a plurality of software products.

Therefore, the specific examples of the subject matter are already described. Other examples still fall within the scope of the appended claims. In some cases, the actions described in the claims may be performed in a different order in order to achieve the desired result. In addition, processing described in the drawings do not require a specific order or sequence shown herein to achieve the desired result. In some implementations, multi-task processing and parallel processing may be advantageous.

The foregoing disclosure is merely illustrative of preferred examples in one or more examples of the present disclosure and not intended to limit one or more examples of the present disclosure. Any modifications, equivalent substitutions and improvements made within the spirit and principles of one or more examples of the present disclosure shall all be encompassed in the scope of protection of one or more examples of the present disclosure.

The invention claimed is:

1. A method of driving an interaction object, comprising:
    obtaining an audio signal at a periphery of a display device;
    obtaining, based on the audio signal, first driving data for driving the interaction object to respond, wherein the first driving data is used to drive the interaction object to perform a first specified action;
    monitoring, in response to outputting the first driving data, the audio signal for detecting a sound of a target object; and
    driving, based on a presence state of the sound of the target object in the audio signal, the interaction object to respond,
    wherein driving, based on the presence state of the sound of the target object in the audio signal, the interaction object to respond comprises:
        driving, in response to that the sound of the target object is detected within a first preset time, the interaction object to perform the first specified action repeatedly.

2. The method according to claim 1, wherein obtaining, based on the audio signal, the first driving data for driving the interaction object to respond comprises:
    determining, in response to that target information is detected in the audio signal, the first specified action matching the target information; and
    obtaining the first driving data for driving the interaction object to perform the first specified action.

3. The method according to claim 2, wherein
    the first driving data comprises at least one of first audio driving data or first action driving data, the first audio driving data is data regarding a sound generated by performing the first specified action, and
    monitoring, in response to outputting the first driving data, the audio signal for detecting the sound of the target object comprises:
        driving, in response to outputting the first action driving data, the interaction object to perform the first specified action, and monitoring the audio signal for detecting the sound of the target object; or
        monitoring, in response to outputting a sound based on the first audio driving data, the audio signal for detecting the sound of the target object.

4. The method according to claim 1, wherein driving, based on the presence state of the sound of the target object in the audio signal, the interaction object to respond comprises:

driving, in response to that the sound of the target object is not detected within the first preset time, the interaction object to return to an initial posture after the first specified action is ended.

5. The method according to claim 4, further comprising:
when the interaction object is driven to return to the initial posture after the first specified action is ended, obtaining, based on the audio signal, second driving data for driving the interaction object to respond, wherein the second driving data comprises at least one of second audio driving data or second action driving data; and
driving, based on the second driving data, the interaction object to respond.

6. The method according to claim 5, wherein obtaining, based on the audio signal, the second driving data for driving the interaction object to respond comprises:
sending the audio signal to a server, so that the server generates, based on the audio signal, the second driving data for driving the interaction object to respond; and
receiving the second driving data from the server.

7. The method according to claim 6, further comprising:
when the interaction object is driven to return to the initial posture after the first specified action is ended, calling, in response to not receiving the second driving data from the server within a second preset time, preset third driving data for driving the interaction object to respond, wherein the preset third driving data comprises at least one of third audio driving data or third action driving data.

8. The method according to claim 1, further comprising:
detecting an intensity of environmental noise based on the audio signal; and
adjusting, based on the intensity of environmental noise, a volume of a sound output from the display device during the interaction object responding.

9. The method according to claim 1, wherein
a plurality of audio signals are obtained by a plurality of sound detection modules distributed in different directions with respect to the display device, and
the method further comprises:
determining an intensity of environmental noise in different directions based on the plurality of A audio signals respectively obtained by the plurality of sound detection modules; and
driving, based on the intensity of environmental noise in different directions, the interaction object to guide the target object to change a position for interaction.

10. An electronic device, comprising:
a processor, and
a memory storing a computer program, wherein when executing the computer program, the processor is caused to:
obtain an audio signal at a periphery of a display device;
an A obtain, based on the audio signal, first driving data for driving an interaction object to respond, wherein the first driving data is used to drive the interaction object to perform a first specified action;
monitor, in response to outputting the first driving data, the audio signal for detecting a sound of a target object; and
drive, based on a presence state of the sound of the target object in the audio signal, the interaction object to respond,
wherein driving, based on the presence state of the sound of the target object in the audio signal, the interaction object to respond comprises:

driving, in response to that the sound of the target object is detected within a first preset time, the interaction object to perform the first specified action repeatedly.

11. The electronic device according to claim 10, wherein the processor is caused to:
determine, in response to that target information is detected in the audio signal, the first specified action matching the target information; and
obtain the first driving data for driving the interaction object to perform the first specified action.

12. The electronic device according to claim 11, wherein the first driving data comprises at least one of first audio driving data or first action driving data, the first audio driving data is data regarding a sound generated by performing the first specified action;
the processor is caused to:
drive, in response to outputting the first action driving data, the interaction object to perform the first specified action, and monitor the audio signal for detecting the sound of the target object; or
monitor, in response to outputting a sound based on the first audio driving data, the audio signal for detecting the sound of the target object.

13. The electronic device according to claim 10, wherein the processor is caused to:
drive, in response to that the sound of the target object is not detected within the first preset time, the interaction object to return to an initial posture after the first specified action is ended.

14. The electronic device according to claim 13, wherein the processor is further caused to:
when the interaction object is driven to return to the initial posture after the first specified action is ended, obtain, based on the audio signal, second driving data for driving the interaction object to respond, wherein the second driving data comprises at least one of second audio driving data or second action driving data; and
drive, based on the second driving data, the interaction object to respond.

15. The electronic device according to claim 14, wherein when obtaining, based on the audio signal, the second driving data for driving the interaction object to respond, the processor is caused to:
send the audio signal to a server, so that the server generates, based on the audio signal, the second driving data for driving the interaction object to respond; and
receive the second driving data from the server.

16. The electronic device according to claim 15, wherein the processor is further caused to:
when the interaction object is driven to return to the initial posture after the first specified action is ended, call, in response to not receiving the second driving data from the server within a second preset time, preset third driving data for driving the interaction object to respond, wherein the preset third driving data comprises at least one of third audio driving data or third action driving data.

17. A display device equipped with a transparent display screen for displaying an interaction object, and the display device performs a method according to claim 1 to drive the interaction object displayed in the transparent display screen to respond to a target object.

18. A non-transitory computer-readable storage medium having a computer program stored thereon, wherein the computer program is executed by a processor to cause the processor to perform operations comprising:

obtaining an audio signal at a periphery of a display device;

obtaining, based on the audio signal, first driving data for driving the interaction object to respond, wherein the first driving data is used to drive the interaction object to perform a first specified action;

monitoring, in response to outputting the first driving data, the audio signal for detecting a sound of a target object; and driving, based on a presence state of the sound of the target object in the audio signal, the interaction object to respond, wherein driving, based on the presence state of the sound of the target object in the audio signal, the interaction object to respond comprises:

driving, in response to that the sound of the target object is detected within a first preset time, the interaction object to perform the first specified action repeatedly.

\* \* \* \* \*

UNITED STATES PATENT AND TRADEMARK OFFICE
CERTIFICATE OF CORRECTION

| | | |
|---|---|---|
| PATENT NO. | : 11,769,499 B2 | Page 1 of 1 |
| APPLICATION NO. | : 17/204568 | |
| DATED | : September 26, 2023 | |
| INVENTOR(S) | : Zilong Zhang, Qing Luan and Lin Sun | |

It is certified that error appears in the above-identified patent and that said Letters Patent is hereby corrected as shown below:

In the Claims

Column 15, Claim 9, Line 42, that reads "directions based on the plurality of A audio signals", should read - directions based on the audio signals -

Column 15, Claim 10, Line 55, that reads "an A obtain, based on", should read - obtain, based on -

Signed and Sealed this
Twenty-seventh Day of February, 2024

Katherine Kelly Vidal
*Director of the United States Patent and Trademark Office*